(12) United States Patent
Zannier

(10) Patent No.: US 10,183,638 B2
(45) Date of Patent: Jan. 22, 2019

(54) POLYMERIC SHOCK ABSORBING ELEMENT FOR A VEHICLE AND LONGITUDINAL SIDE MEMBER

(71) Applicant: TRES SRL, Turin (IT)

(72) Inventor: Stefania Zannier, Correzzana (IT)

(73) Assignee: TRES S.r.l., Turin (IT)

( * ) Notice: Subject to any disclaimer, the term of this patent is extended or adjusted under 35 U.S.C. 154(b) by 20 days.

(21) Appl. No.: 15/125,266

(22) PCT Filed: Mar. 12, 2015

(86) PCT No.: PCT/IB2015/051800
§ 371 (c)(1),
(2) Date: Sep. 12, 2016

(87) PCT Pub. No.: WO2015/136476
PCT Pub. Date: Sep. 17, 2015

(65) Prior Publication Data
US 2017/0072884 A1 Mar. 16, 2017

(30) Foreign Application Priority Data

Mar. 12, 2014 (IT) .............................. MI2014A0393

(51) Int. Cl.
*B60R 19/18* (2006.01)
*F16F 7/12* (2006.01)
(Continued)

(52) U.S. Cl.
CPC ............. *B60R 19/18* (2013.01); *B60R 19/22* (2013.01); *B62D 21/157* (2013.01); *F16F 7/121* (2013.01);
(Continued)

(58) Field of Classification Search
CPC ............ B60R 19/22; B60R 2019/1846; B62D 21/157; B62D 25/025; F16F 7/121
(Continued)

(56) References Cited

U.S. PATENT DOCUMENTS 4,573,724 A * 3/1986 Campen .................. B60R 19/26
188/379
5,746,419 A 5/1998 McFadden et al.
(Continued)

FOREIGN PATENT DOCUMENTS

EP 2455636 A1 5/2012
JP 9-71200 A 3/1997

OTHER PUBLICATIONS

International Search Report of PCT/IB2015/051800 dated May 11, 2015.
Written Opinion of PCT/IB2015/051800 dated May 11, 2015.

*Primary Examiner* — Hilary L Gutman
(74) *Attorney, Agent, or Firm* — Sughrue Mion, PLLC

(57) ABSTRACT

Polymeric shock absorbing element for a vehicle including a substantially honeycomb structure having a plurality of channels which has a lateral external surface extending from a first open frontal end to a second open rear end, the shock absorbing element insertable and securable within an internal lateral cavity of a chassis of said vehicle, the internal lateral cavity being defined by at least two metallic plates. The lateral external surface includes at least one substantially planar face positioned on one side of the polymeric shock absorbing element and the additionally includes at least one metallic fixing element having a central portion which in turn includes a first central wall which is made integral with a corresponding substantially planar face of the lateral external surface, the at least one metallic fixing element additionally includes a plurality of side stiffeners which are weldable or made integral with the two metallic sheets.

17 Claims, 13 Drawing Sheets

(51) Int. Cl.
  *B60R 19/22*   (2006.01)
  *B62D 21/15*   (2006.01)

(52) U.S. Cl.
  CPC ............... *B60R 2019/1813* (2013.01); *B60R 2019/1846* (2013.01); *F16F 2224/0225* (2013.01); *F16F 2224/0233* (2013.01)

(58) Field of Classification Search
  USPC ........................................................ 296/209
  See application file for complete search history.

(56) References Cited

U.S. PATENT DOCUMENTS

| | | | | |
|---|---|---|---|---|
| 7,866,716 B2* | 1/2011 | Perucca | ................. | B60R 19/18 293/102 |
| 8,267,428 B2* | 9/2012 | DePue | ................... | B60R 21/02 280/751 |
| 8,579,362 B2* | 11/2013 | Di Modugno | .......... | B60R 19/34 293/133 |
| 8,864,216 B2* | 10/2014 | Nagwanshi | .......... | B62D 29/004 296/187.01 |
| 8,905,206 B2* | 12/2014 | Zannier | ................... | B60R 19/03 188/371 |
| 9,067,550 B2* | 6/2015 | Nagwanshi | ............. | B60R 19/34 |
| 9,771,109 B2* | 9/2017 | Nagwanshi | ............. | B60R 19/03 |
| 2007/0122510 A1* | 5/2007 | Mendiboure | .......... | B60J 5/0451 425/4 R |
| 2010/0173126 A1* | 7/2010 | Malek | .................... | B32B 15/08 428/138 |
| 2010/0187865 A1* | 7/2010 | Malek | ................... | B62D 25/02 296/203.03 |
| 2012/0153669 A1* | 6/2012 | Nagwanshi | .......... | B62D 29/005 296/187.08 |
| 2013/0127191 A1* | 5/2013 | Zannier | ................... | B60R 19/03 293/133 |
| 2013/0193699 A1 | 8/2013 | Zannier | | |

\* cited by examiner

POLYMERIC SHOCK ABSORBING ELEMENT FOR A VEHICLE AND LONGITUDINAL SIDE MEMBER

CROSS REFERENCE TO RELATED APPLICATIONS

This application is a National Stage of International Application No. PCT/IB2015/051800 filed Mar. 12, 2015 claiming priority based on Italian Patent Application No. MI2014A000393, filed Mar. 12, 2014, the contents of which are incorporated herein by reference in their entirety.

The present invention relates to a polymeric shock absorbing element for a vehicle for application in the automotive industry and in particular utilizable as a sacrificial element in a bumper structure of a motor vehicle.

Typically a shock absorbing element is able to absorb a portion of kinetic energy during an impact of the motor vehicle against a fixed or moving obstacle.

In particular the present invention relates to a shock absorbing element of the polymeric type, in particular of the type produced by injection moulding and having a substantially honeycomb structure, so as to have good resistance and high stiffness, as well as a reduced weight.

The present invention additionally relates to a longitudinal side member for a motor vehicle.

Each shock absorbing element has a first frontal end which is first to be subject to the impact, and a second rear end which is constrained to a chassis of the vehicle.

Each shock absorbing element is in fact designed to undergo plastic deformation and a programmed collapse in the event of a crash, starting from a frontal portion towards a second rear portion thereof, thus consequently determining a plurality of folds starting from said frontal portion towards said second rear portion.

In this way each shock absorbing element is able to absorb and progressively dissipate a portion of kinetic energy by means of plastic deformation and through the propagation of said plurality of folds, while maintaining limited weight and volume.

In particular the present invention relates to a polymeric shock absorbing element insertable in the lateral side member of the same in order to limit the damage caused by a side impact of the vehicle against a pole or a side barrier.

In this case, the polymeric shock absorbing element is usually fixed by means of a plurality of rivets to the longitudinal side member of the vehicle for be correctly stressed and for absorb a part of the same impact.

A disadvantage of the polymeric shock absorbing elements inserted into the longitudinal members is that during a lateral impact there are often unexpected breakages in correspondence of the rivets, which involve instability and a malfunction of the polymeric shock absorbing elements, with a consequently reduced vehicle safety.

Another analogous disadvantage is that in the case of a partial collapse of a fixing element constrained by means of rivets to the second rear end of the polymeric shock absorbing elements, it determines an intensification of the stresses on the second rear end itself thus compromising shock absorbing element functionality.

This occurs as, in this case also, the plurality of folds starts from said second rear end.

In addition, the present invention relates to a bumper structure in particular for a means of transport such as for example a motor vehicle.

The present invention relates to a type of side bumper structure having at least one polymeric shock absorbing element.

The known side bumper structures having at least one polymeric shock absorbing element also comprise a longitudinal side member that is a part of the chassis of the vehicle.

In particular, said longitudinal side member is formed by at least two metallic plates, each metallic plate is substantially omega-shaped, which are coupled and welded together for define a metallic box-shaped body having an internal longitudinal cavity into which said at least one polymeric shock absorbing element is inserted and constrained.

Said at least one polymeric shock absorbing element in particular presents a substantially honeycomb structure which allows a portion of kinetic energy to be absorbed due to an impact of the motor vehicle against a fixed or moving object.

Each polymeric shock absorbing element is positioned and constrained within said longitudinal cavity defined by said two metallic plates in such a way as to absorb a part of the kinetic energy during said impact, consequently reducing the kinetic energy transmitted to said chassis.

A disadvantage of the side bumper structures is that a breakage of the polymeric fixing portions of each shock absorbing element it determines an high deformation of the lateral side member with consequent deformation of the interior compartment of the vehicle and with a consequent extensive injury to passengers.

In particular in the case of a side impact with a pole, there would moreover be even greater injury to passengers, since the deformation of the interior compartment would be greater still.

The aim of the present invention is to produce a polymeric shock absorbing element for a vehicle which allows the weight of the bumper structure to be overall reduced and at the same time, which allows the impact force transmitted to a vehicle chassis of the vehicle to be reduced to a minimum.

Another aim is to produce a polymeric shock absorbing element for a vehicle that allows production costs to be reduced and that allows a substantially constant collapsing force to be obtained during an impact, while at the same time maintaining high stability.

Another aim is to provide polymeric shock absorbing element for a vehicle that allows a high cost reduction in cost and that allows the easy installation thereof onto a bumper structure.

A further aim is to provide a bumper structure for a vehicle that allows production costs to be reduced and that also allows passenger injury to be reduced to a minimum in the event of a side impact of the vehicle with a pole or a barrier, while at the same time maintaining a high absorption capacity of the bumper structure during the impact.

A further aim is to provide a polymeric shock absorbing element for a vehicle and a bumper structure for a vehicle easy to realize and economically advantageous.

These claims according to the present invention are achieved by realizing a polymeric shock absorbing element for a vehicle and a bumper structure for a vehicle as described in claim 1.

Further features of the invention are highlighted in the dependent claims.

The features and the advantages of a polymeric shock absorbing element for a vehicle and of a bumper structure according to the present invention will become clearer from the following exemplifying and not limitative description, referred to the accompanying schematic drawings, in which.

Figure 1:
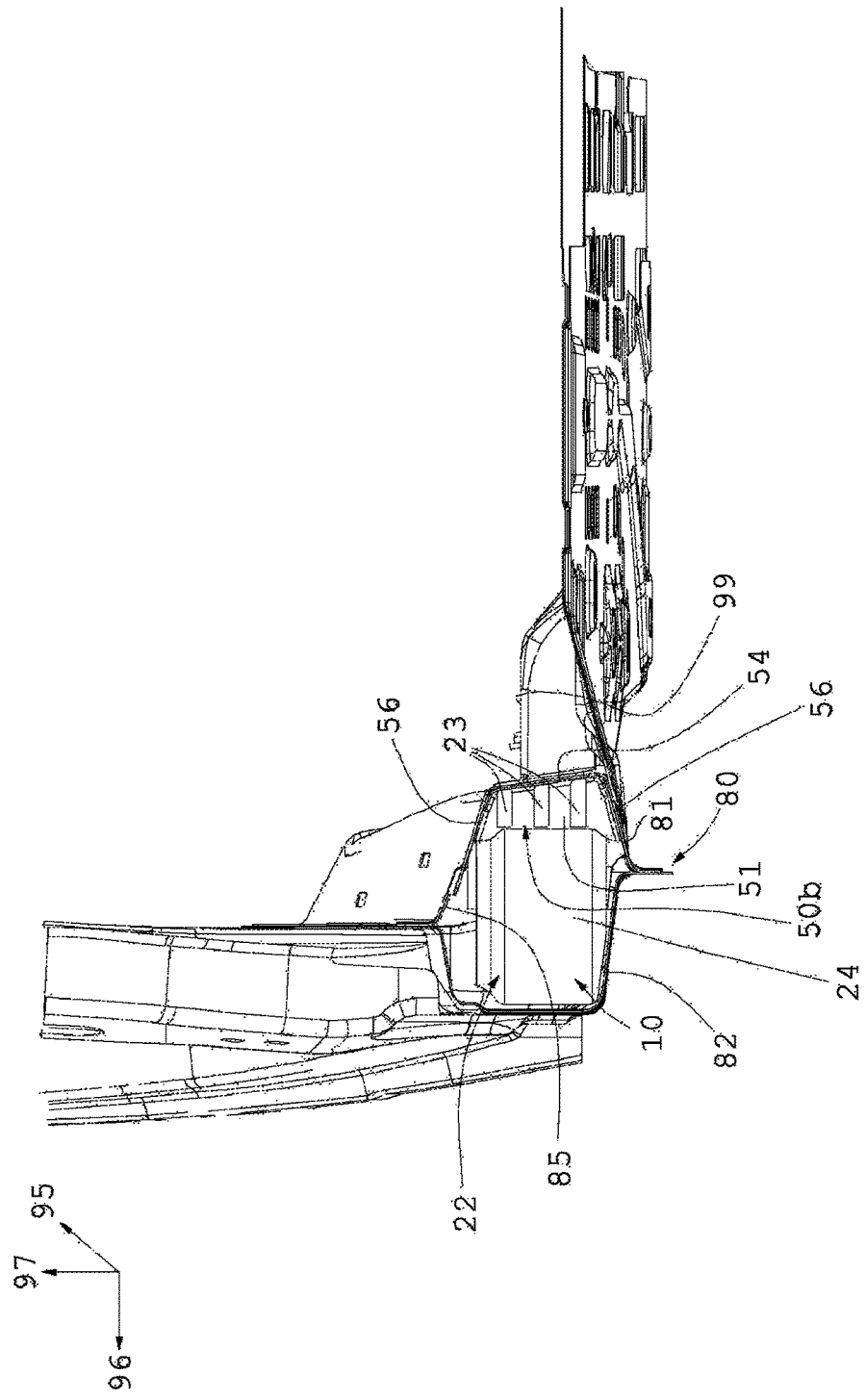
FIG. 1 is a side elevation sectioned view of a preferred embodiment according to the present invention.

According to the present invention it is provided a polymeric shock absorbing element 10 for a vehicle comprising a substantially honeycomb structure 20 having a plurality of channels 30 realized by moulding in a single piece in a polymeric material, each of which is preferably provided with a substantially hexagonal cross-section, moreover said substantially honeycomb structure 20 has an lateral external surface 22 which extends from a first open frontal end 12 to a second open rear end 14.

Said plurality of channels 30 internally extends to said shock absorbing element 10 starting from said first open frontal end 12 to said second open rear end 14, further each channel 30 of said plurality of channels 30, being internally tapered towards said second open rear end 14, and preferably having an inner rake angle preferably included between 0° and 1.5°, measured with respect to a longitudinal extension axis of each channel 30.

Said shock absorbing element 10 being insertable and fixable within an internal lateral cavity 85 of a chassis of said vehicle, in particular said internal lateral cavity 85 is defined by at least two metallic plates, in particular a first metallic plate 81 and a second metallic plate 82, which are welded together or made integral with each other for form a longitudinal side member 80 of said vehicle, said longitudinal side member 80 is oriented along a longitudinal direction 95 of said vehicle and is also placed in a side position with respect to an interior compartment 99 of said vehicle.

In particular said longitudinal side member 80 comprises a first metallic plate 81 and a second metallic plate 82, at least one of which is substantially omega-shaped.

Preferably said first metallic plate 81 and the second metallic plate 82 are facing one to the other and comprise two contact zones which are oriented parallel to a vertical direction 97; further said first metallic plate 81 and said second metallic plate 82 are welded together in such a way to define said longitudinal side member 80 having the form of a tubular metallic element provided with said internal lateral cavity 85 which consequently it is also oriented along said longitudinal direction 95 of said vehicle.

According to the present invention, said lateral external surface 22 comprises at least one substantially planar face 24 positioned on one side of said polymeric shock absorbing element 10 and further said polymeric shock absorbing element 10 comprises at least one metallic fixing element 50 which includes a central portion 51 that is, in particular, substantially L-shaped, which in turn comprises a first central wall 53 which is made integral with a corresponding substantially planar face 24 of said lateral external surface 22, in particular, by means of a plurality of protrusions 23, of which said substantially honeycomb structure 20 is equipped, which outwardly extend from said substantially planar face 24.

Preferably said at least one metallic fixing element 50 further comprises a plurality of lateral stiffeners 56 which are weldable or in any case secured or made integral respectively to a plurality of corresponding inner walls of said first metallic plate 81 and/or of said second metallic plate 82.

In particular said plurality of inner walls, in particular 81a, 81b and 81c, are internal with respect to said internal lateral cavity 85.

This advantageously allows an excellent shock absorbing element stability to be obtained during an impact, preventing the rotation of the same inside the internal lateral cavity 85.

Further, advantageously during an impact, said at least one metallic fixing element 50 is able to guide the movement of said polymeric shock absorbing element 10 within said internal lateral cavity 85 allowing to the same to continue to absorb energy even in the case of detachment of said at least one metallic fixing element 50 from the plurality of inner walls of said first metallic plate 81 and/or of said second metallic plate 82 of said longitudinal side member 80.

Figure 2:
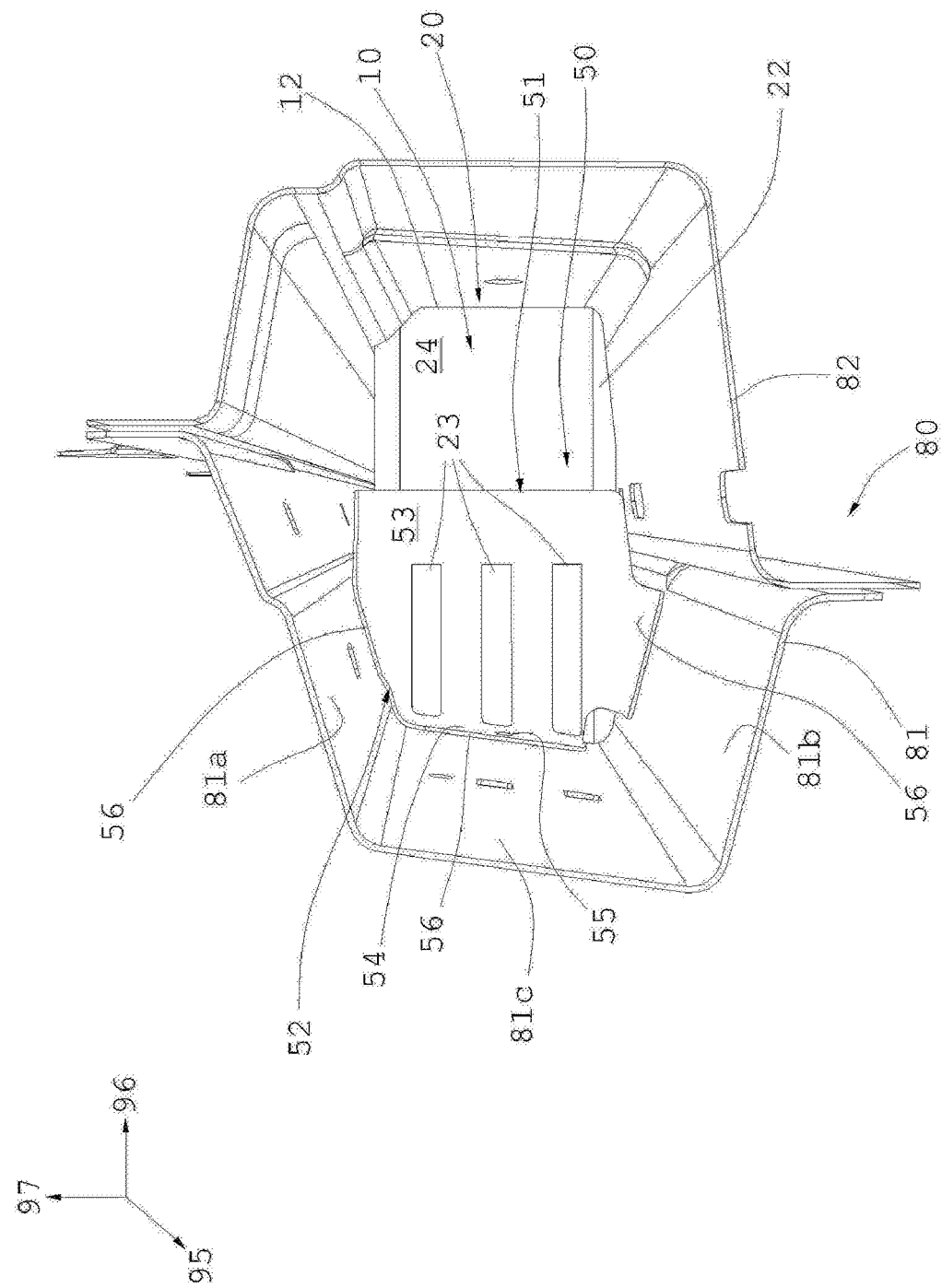
FIG. 2 is a frontal elevation view of a preferred embodiment according to the present invention.
Figure 3:
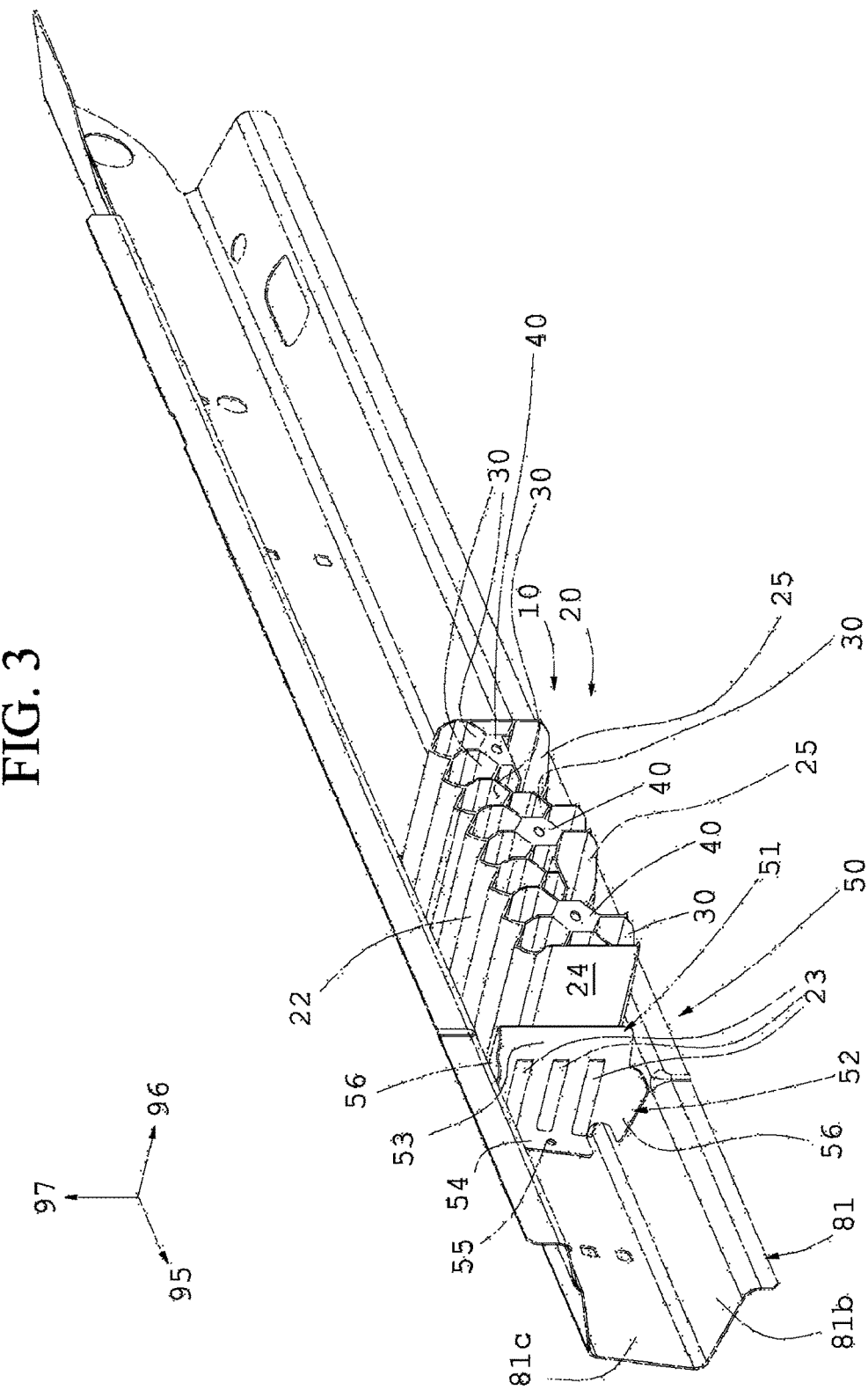
FIG. 3 is a right side perspective elevation top view of a detail of FIG. 2.
Figure 4:
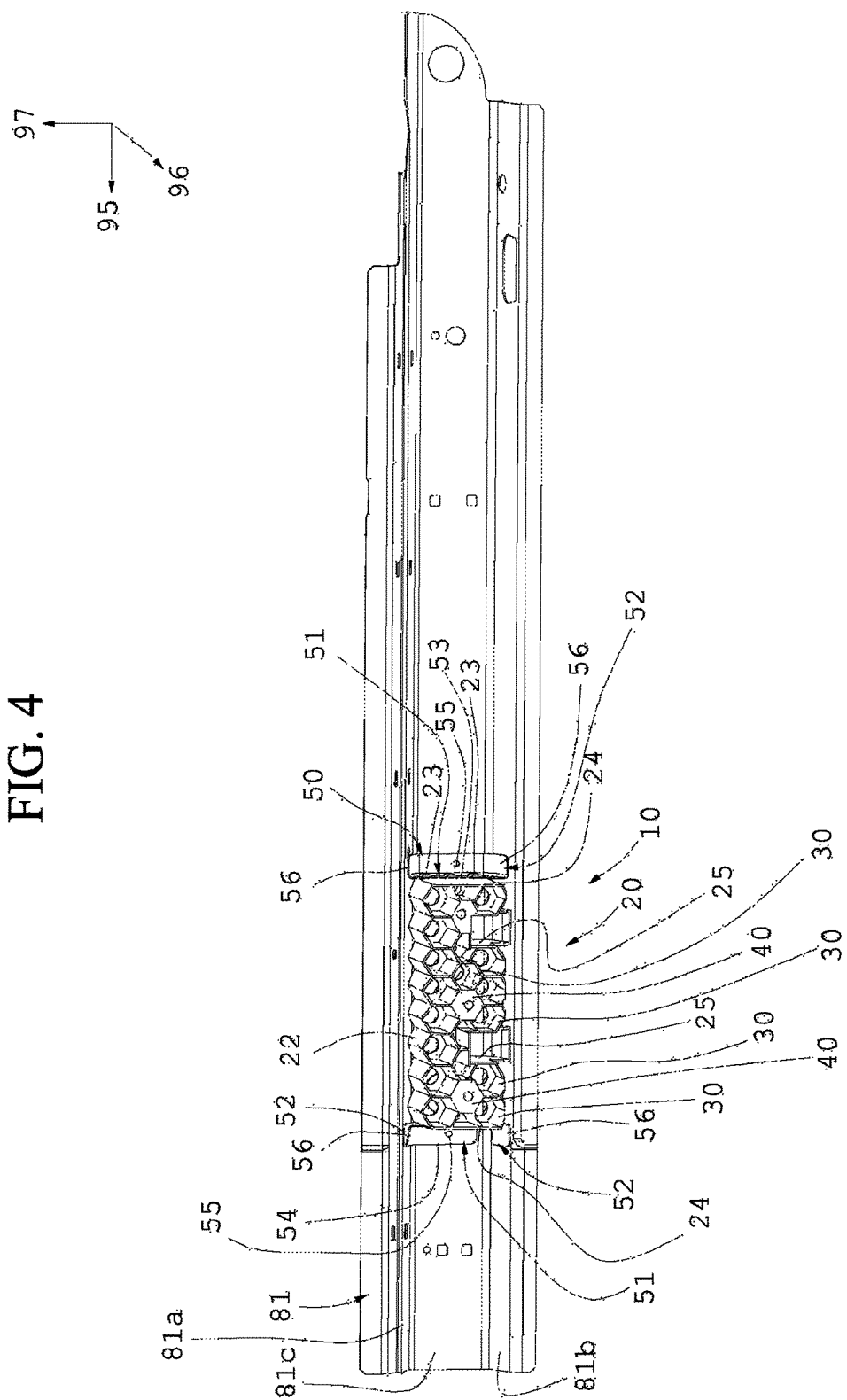
FIG. 4 is a right side elevation view of a detail of FIG. 2.
Figure 5:
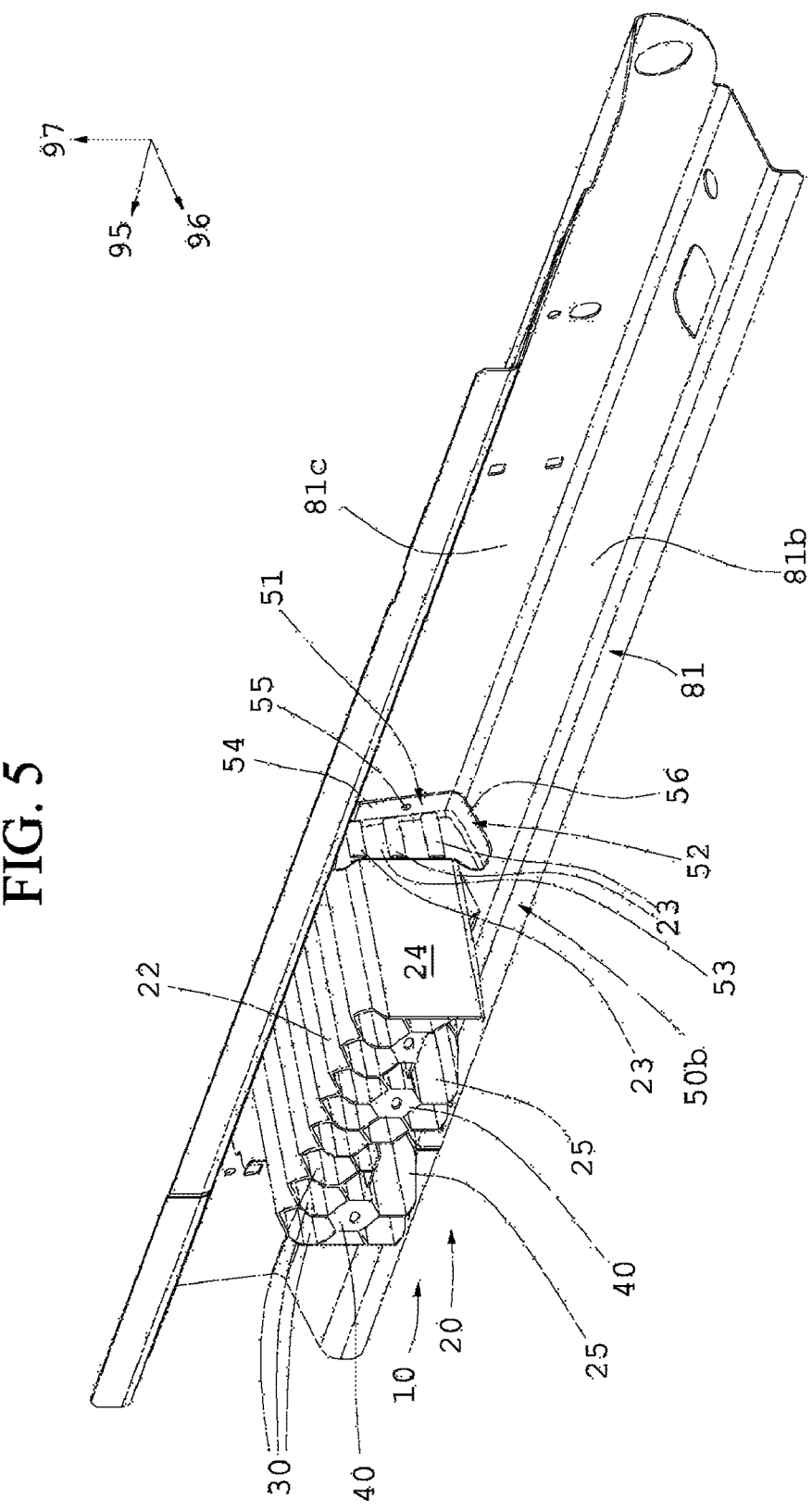
FIG. 5 is side elevation perspective rear view of a preferred embodiment according to the present invention.
Figure 6:
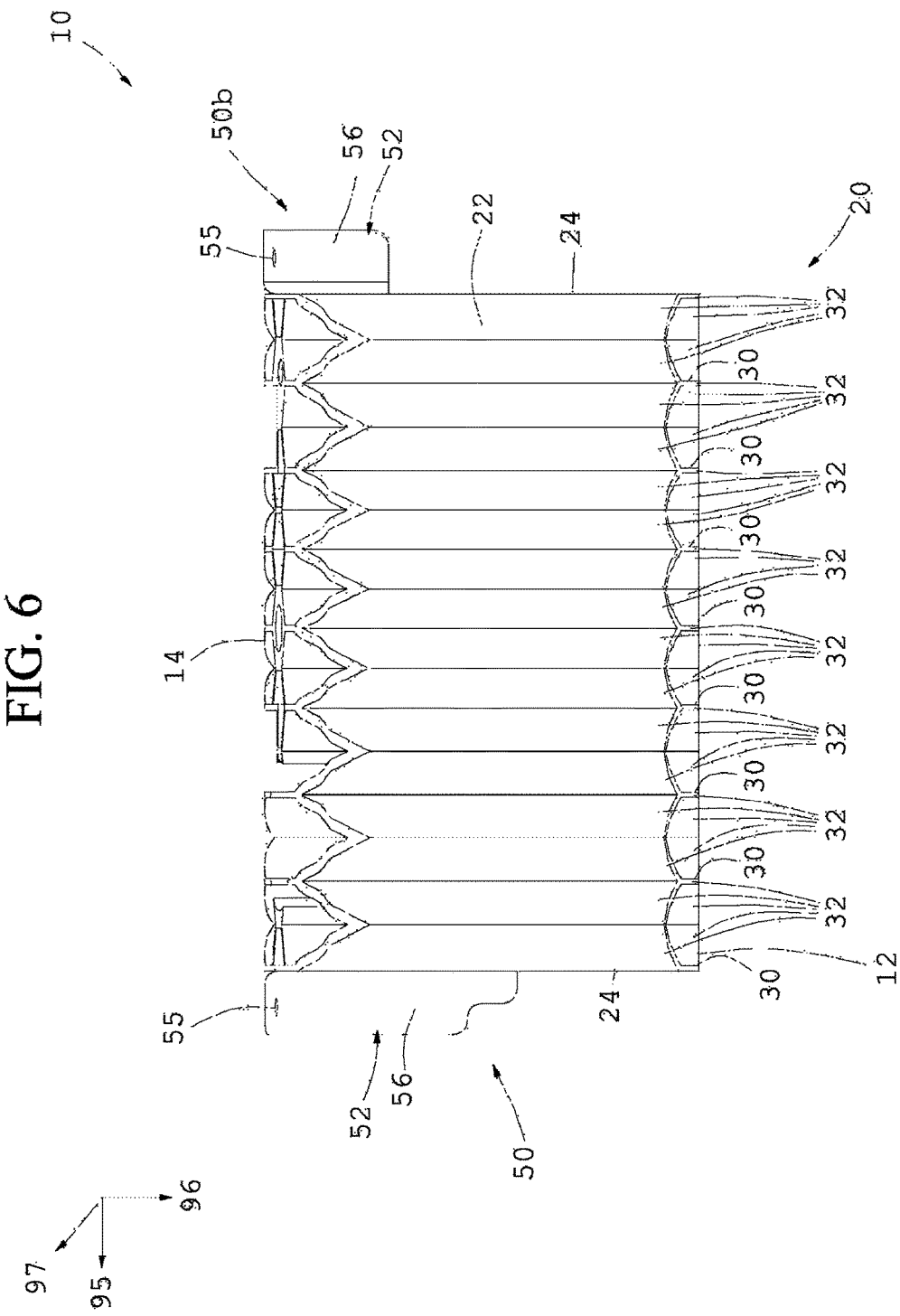
FIG. 6 is a top view of the polymeric shock absorbing element of FIG. 4.
Figure 7:
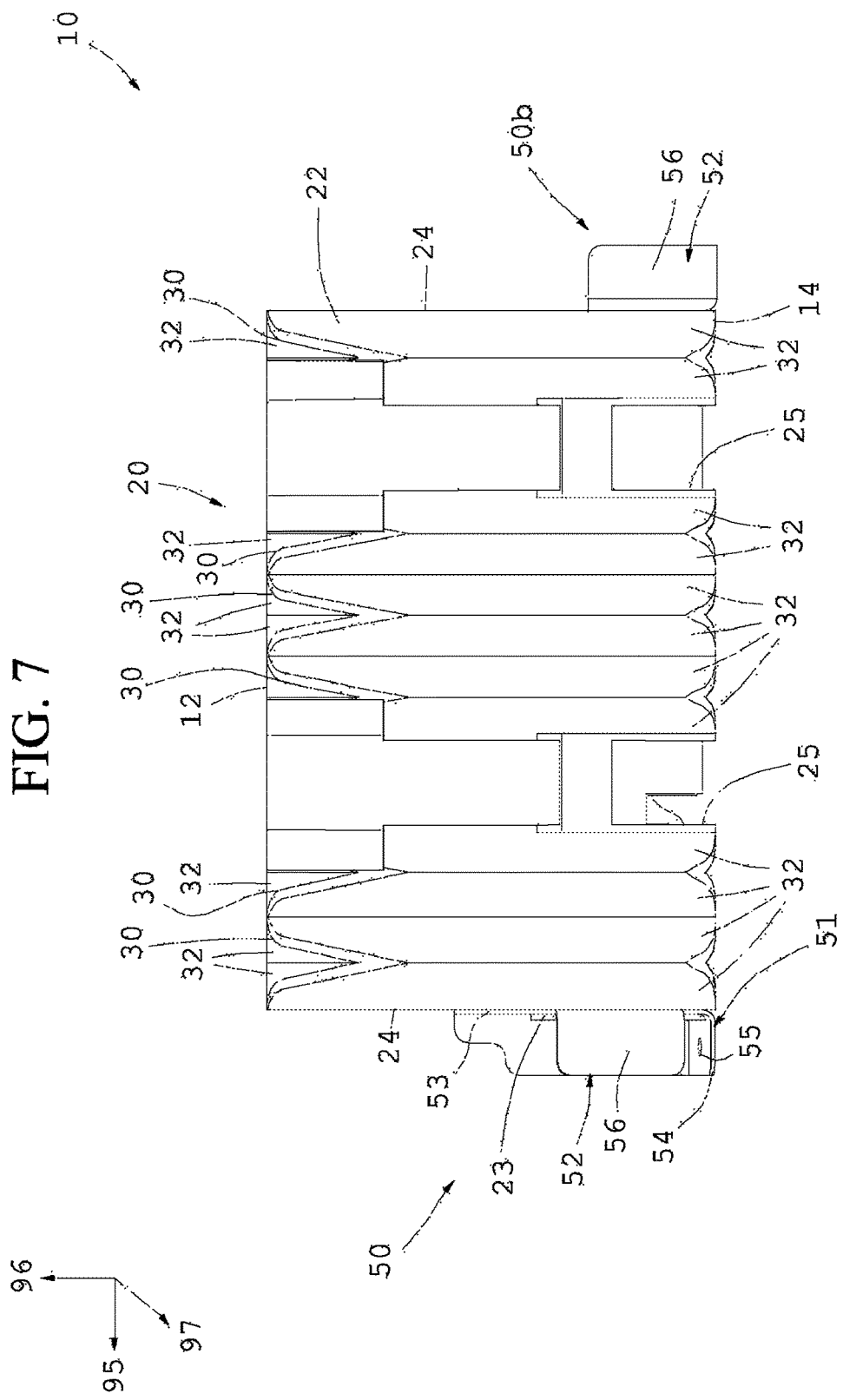
FIG. 7 is a bottom view of the shock absorbing element of FIG. 4.

In particular with reference to FIG. 2 a plurality of inner walls 81a, 81b and 81c are shown, which are internal to said internal lateral cavity 85 and with which are welded or made integral said plurality of stiffeners 56 of said at least one metallic fixing element 50, in particular of each metallic fixing element 50 and 50b.

In particular said substantially honeycomb structure 20 comprises a plurality of protrusions 23 that externally extend from said substantially planar face 24 within a plurality of through grooves, in particular at least three through grooves, which are realized within said at least one metallic fixing element 50 in particular in a region proximal to said second open rear end 14, in such a way to obtain an extremely wide fixing surface so as to reduce the intensification of the stresses to a minimum, thus preventing the breakages of the prior art.

Preferably said lateral external surface 22 of said substantially honeycomb structure 20 comprises two substantially planar faces 24 which are positioned on two opposite sides of said polymeric shock absorbing element 10 and said at least one polymeric shock absorbing element 10 additionally comprises a first metallic fixing element 50 and a second metallic fixing element 50b, of the type previously described, which are positioned on opposite sides with respect to said substantially honeycomb structure 20, and which are preferably oriented along a longitudinal extension direction 95 of said internal lateral cavity 85.

This advantageously allows a greater stability of said shock absorbing element.

Preferably said at least one metallic fixing element 50, in particular each metallic fixing element 50 and 50b, having a first central portion 51 which is particular substantially L-shaped, further comprises a plurality of lateral stiffeners 56 which can be respectively weldable or in any case constrainable or made integral with a plurality of corresponding inner walls of said first metallic plate 81 and/or of said second metallic plate 82.

This advantageously allows an excellent shock absorbing element stability to be obtained during an impact, preventing the rotation thereof inside the internal lateral cavity 85.

Furter, advantageously during an impact, said at least one metallic fixing element 50 is able to guide the movement of said polymeric shock absorbing element 10 within the internal lateral cavity 85 allowing the same to continue to absorb energy even in the case of detachment of said at least one metallic fixing element 50 from the plurality of inner walls of said first metallic plate 81 and/or of said second metallic plate 82 of said side member 80.

In particular said at least one metallic fixing element 50, in particular each metallic fixing element 50 and 50b, is made of a weldable metallic plate, such as in particular zinc-plated steel, having a thickness included between 1 and 3 mm and preferably included between 1 and 2 mm, and preferably said at least one metallic fixing element 50 is also substantially shaped like a tiler's knee-pad.

In particular said first central wall 53 of said central portion 51 of said first metallic fixing element 50, and preferably also said second metallic fixing element 50b, being perpendicular to said longitudinal direction 95 of said vehicle and positioned internally to said internal lateral cavity 85, and also said plurality of lateral stiffeners 56 are parallel to corresponding inner walls, in particular 81a, 81b and 81c, of said first metallic plate 81 and/or of said second metallic plate 82 and said plurality of lateral stiffeners 56 are welded or made integral to corresponding inner walls, in particular 81a, 81b and 81c. This advantageously allows an high rigidity and a reduced weight to be obtained, thus allowing at the same time an high stability of said shock absorbing element during said impact, advantageously preventing possible rotations of the same within the internal lateral cavity 85.

In particular said plurality of channels 30 of said substantially honeycomb structure 20 is oriented parallel to a longitudinal direction 98, which is preferably inclined with respect to a transverse direction 96 of said vehicle, which is in turn orthogonal to a longitudinal direction 95 of said vehicle, and also said longitudinal direction 95 and said transverse direction 96 are orthogonal to a vertical direction 97.

This advantageously allows a better absorption in the event of a side impact, particularly in the event of a collision with a side pole.

Preferably said central portion 51 has a second central wall 54, in particular substantially perpendicular to said first central wall 53, which is substantially aligned with said second open rear end 14 and further the same is perpendicular to said transverse direction 96 of said vehicle and it is preferably provided with a through hole 55 and which is also internally weldable within said internal lateral cavity 85 to a preferably vertical wall of said first metallic plate 81, which is more internal to said vehicle with respect to said second metallic plate 82.

Preferably said at least one metallic fixing element 50, in particular each metallic fixing element 50 and 50b, comprises said first central portion 51, in particular substantially L-shaped, having said first central wall 53 which is substantially planar and is made integral with a corresponding substantially planar face 24 of said lateral external surface 22 of said polymeric shock absorbing element 10 and, additionally, said at least one metallic fixing element 50, in particular each metallic fixing element 50 and 50b, comprises a third metallic portion 52 which is substantially U-shaped which extends perpendicularly respect to said first wall 51 of said first central portion 51, extending externally with respect to said substantially honeycomb structure 20, said third metallic portion 52 also includes a second central wall 54 of said first central portion 51.

Preferably said third metallic portion 52 comprises a plurality of stiffening portions 56 which are in particular welded or made integral with a corresponding plurality of inner walls of said more internal first metallic plate 91.

In particular at least two stiffening portions 56 of said plurality of stiffening portions 56 are inclined to each other of an angle included between 10° and 60°, preferably included between 30° and 55°, and in addition the same are weldable with two corresponding inner walls of said first, more internal, metallic plate 81, to advantageously prevent a possible rotation of said polymeric shock absorbing element 10 during said impact.

In particular, said first metallic fixing element 50 is positioned in a proximal zone with respect to a frontal end of said vehicle, while said second metallic fixing element 50b is positioned in a distal zone with respect to said frontal end of said vehicle.

Preferably, said first central wall 53 of said first central portion 51 of said second metallic fixing element 50b has a lower height than said first central wall 53 of said first central portion 51 of said first metallic fixing element 50, this advantageously allows a reduction in the overall weight and also a greater shock-absorbing capacity in the event of an angled side impact with respect to said longitudinal direction 95.

Preferably said essentially honeycomb structure 20 comprises a planar polymeric stiffening plate 60 integrated internally to the same which is realized in a single piece by injection molding with said substantially honeycomb structure 20 and preferably also with said at least one metallic fixing element 50, in particular also with said first metallic fixing element 50 and with said second metallic fixing element 50b, and additionally said planar polymeric stiffening plate 60 is perpendicular to the extension direction 98 of the plurality of channels 30 and it is positioned at a predetermined distance in parallel with respect to said second open rear end 14 and, in particular it is positioned at an intermediate distance between said second open rear end 14 and said first open frontal end 12.

Preferably each channel 30 of said substantially honeycomb structure 20 comprises a first channel portion included between said planar polymeric stiffening plate 60 and said first open frontal end 12, and a second channel portion included between said planar polymeric stiffening plate 60 and said second open rear end 14, said first channel portion having a first wall thickness and said second channel portion having a second wall thickness, said second wall thickness having an average value that is at least 20% greater and preferably at least 30% greater with respect to the average value of said first wall thickness, in particular substantially at least 1.5 times the average value of said first wall thickness.

This advantageously allows a different behavior of the substantially honeycomb structure 20 to be obtained since an upper part of the channels 30 having said first wall thickness is capable of having a plurality of programmed folds even with impact forces of low magnitude, while a lower part of the channels 30, having said second thickness, has a lesser pliability and allows to absorb impact forces of low magnitude, and at the same time allow to significantly stiffen the side member 80 of the chassis of the vehicle, limiting and reducing the deformation thereof so as to reduce to a minimum the deformation of said interior compartment 99 of the vehicle, so as to obtain, following an initial deformation, a rigid displacement of the side member 80 without it being able to continue folding inside of the vehicle, thus preserving the passengers as much as possible.

Further preferably said first wall thickness starting from said first open frontal end 12 gradually increases towards said planar polymeric stiffening plate 60, and additionally said second wall thickness starting from said second rear end 14 gradually increases toward said planar polymeric stiffening plate 60.

This advantageously allows the behavior of said polymeric shock absorbing element to be further stabilized during a side impact.

In particular said planar polymeric stiffening plate 60 comprises a plurality of through holes 62, which are realized on a base surface of the same and which are preferably internally positioned internally to each channel 30.

This advantageously allows said polymeric shock absorbing element 10 to be lightened and at the same time allows to reduce the rigidity of the inner portion thereof so as to not compromise the shock-absorbing capacity of the channel 30 part positioned above said planar polymeric stiffening plate 60.

Preferably said substantially honeycomb structure 20 comprises at least one through hole 25, preferably two through holes 25, each of which extends from said first open frontal end 12 to said second open rear end 14, in parallel to said plurality of channels 30, said at least one through hole 25 in particular having a substantially rectangular cross-section, advantageously allows the insertion into the same of a welding clamp to allow welding, in proximity of said second open rear end 14, said at least two metallic plates 81 and 82 of said longitudinal side member 80 so as to obtain a sufficient rigidity of the chassis of said vehicle while at the same time allowing a high degree of manufacturing versatility of said longitudinal side member 80 since it allows the position and the number of polymeric shock absorbing elements inside the same to be modified with extreme ease.

This advantageously allows said polymeric shock absorbing element 10 to be positioned in any position within said internal lateral cavity 85 of said longitudinal side member 80 since it is possible to advantageously weld said first metallic plate 81 and said second metallic plate 82 inside said polymeric shock absorbing element 10 in correspondence of at said second open rear end 14, passing through said at least one through hole 25, making said longitudinal side member 80 stiffer.

Figure 13:
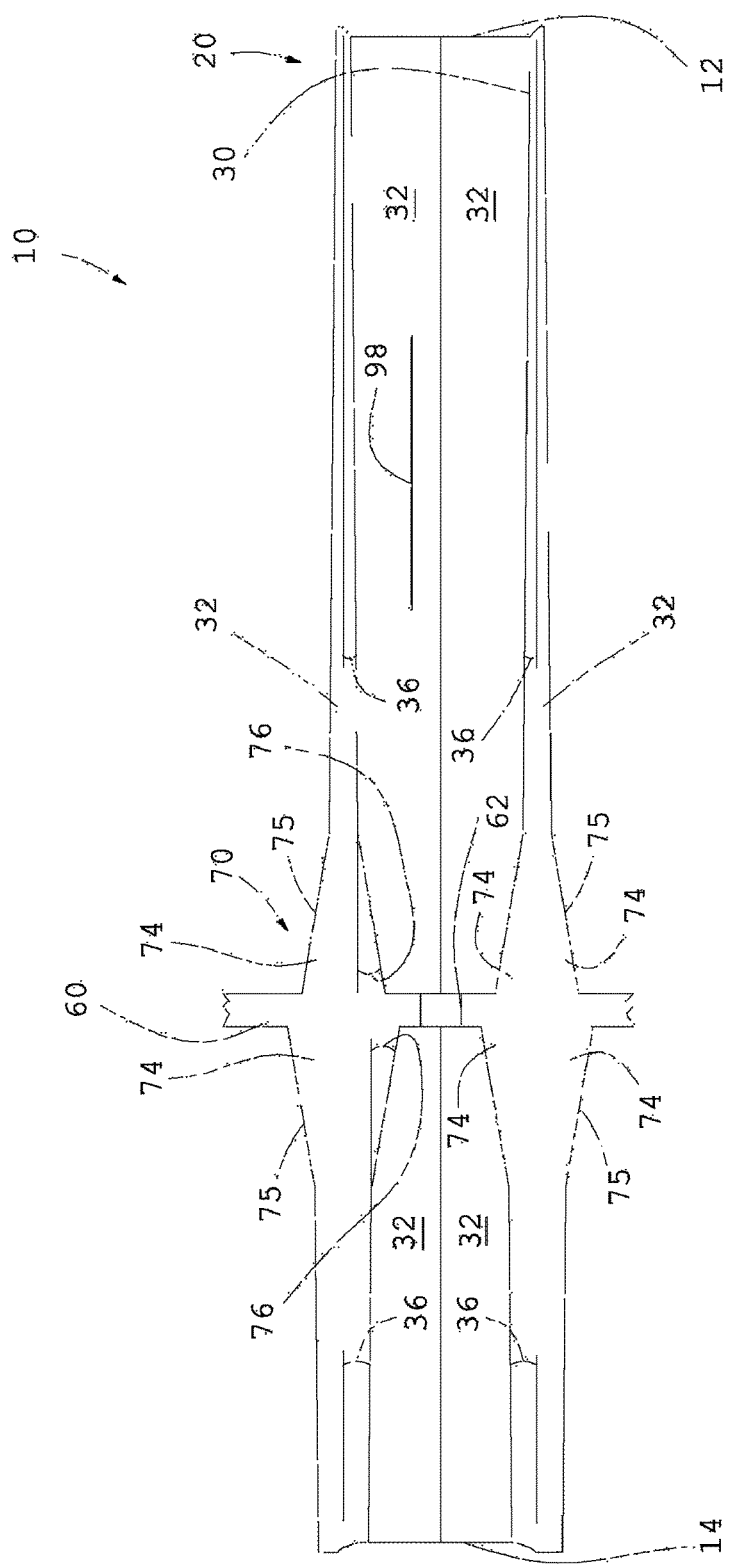
FIG. 13 is a sectioned view of a detail of a channel of FIG. 12.

In particular with reference to FIG. 13, the plurality of channels 40 continuously extends from said second open rear end 14 to said first open frontal end 12 so that, in particular, the holes 62 of said planar polymeric stiffening plate 60 in correspondence of the channels 40 coincide with the transverse cross-section of the channels 40 themselves, in other words, the planar polymeric stiffening plate 60 preferably comprises a plurality of holes 62 having hexagonal cross-section and coinciding with the cross-section of the corresponding channels 40.

Preferably said polymeric material is selected between: a mixture of a polyphenylene-ether (PPE) and a polyamide (PA), a mixture of a polyphenylene-ether (PPE) and a polybutylene-terephthalate (PBT), a mixture of a polyphenylene-ether (PPE) and a polyethylene (PE), a mixture of a polyphenylene-ether (PPE) and a polypropylene (PP), a mixture of a polyphenylene-ether (PPE) and a polystyrene (PS), a mixture of a polycarbonate (PC) and a polybutylene-terephthalate (PBT), a mixture of a polycarbonate (PC) and a polyethylene-terephthalate (PET), a polypropylene rubber, a polyamine rubber, and/or derivatives thereof.

Said polymeric shock absorbing element 10 is preferably realized in a single piece with a polymeric material capable of withstanding heat treatments at 180° for one hour, such as in particular a polyamide in particular blended with polyphenyloxide, and more in particular a polymeric material commonly known as NORIL®.

This advantageously allows said polymeric shock absorbing element 10 to be welded and secured to said longitudinal side member of said vehicle, and also allows cataphoresis treatments to be carried out without compromising the functional shock-absorbing characteristics of said polymeric shock absorbing element 10.

Preferably said substantially honeycomb structure 20 comprises a second plurality of channels 40 realized in a single piece with said plurality of channels 30, by injection moulding.

Said second plurality of channels 40 extends from said second open rear end 14 to said first open frontal end 12, further each channel 40 of said second plurality of channels 40 also being internally tapered towards said first open frontal end 12 and preferably having an inner rake angle.

Preferably each channel 40 comprises just one plurality of second walls 34, each of which is inclined with respect to a longitudinal axis 98 of each channel 40.

It is thus advantageously possible to reduce the extraction force of said polymeric shock absorbing element 10 from a mould at the end of an injection moulding step, while at the same time maintaining a good stability of said polymeric shock absorbing element 10 during an impact.

A high extraction force is a major problem for the production of polymeric shock absorbing elements 10 as it does not allow the production of large sized pieces having greater shock-absorbing capacities.

It is thus advantageously possible to produce a polymeric shock absorbing element 10 that is easy to produce and with a limited production cost as it requires a much smaller and less expensive injection moulding machine since it does not require very powerful extraction means.

Alternatively this advantageously allows two polymeric shock absorbing element 10 to be moulded in the same mould, while maintaining the extraction force of just one polymeric shock absorbing element not having said second plurality of channels 40 that are internally tapered towards said first frontal end 12.

Preferably each channel 40 of said second plurality of channels 40 is only surrounded by 30 channels of said plurality of channels 30 which are internally tapered towards said second open rear end 14 and, in particular towards a planar polymeric stiffening plate 60 positioned between said first open frontal end 12 and said second open rear end 14.

It is thus advantageously possible to further reduce the extraction force from a mould of said polymeric shock absorbing element 10 at the end of an injection moulding step.

It is advantageously possible to realize a polymeric shock absorbing element 10 having a much wider transverse section without the need of an high extraction force for extract the same from a mould.

Indeed, it is thus possible to maintain high rake angles and it is, at the same time, possible to obtain a more gradual increase of the resistant section in direction of said second rear end 14 of said substantially honeycomb structure 20.

Advantageously, by means of said second plurality of channels 40 that are internally tapered towards said first frontal end 12, it is possible to obtain a plurality of walls 34 having a thickness that is substantially constant along the entire longitudinal length of said polymeric shock absorbing element 10.

Preferably each channel 40 of said second plurality of channels 40 is surrounded by at least 3 channels 30 that are tapered towards said second open rear end 14 and in particular towards a planar polymeric stiffening plate 60 that is positioned between said first open frontal end 12 and said second open rear end 14.

This advantageously allows a plurality of walls 34 with constant thickness to be obtained, thus allowing a much more gradual increase of the resistant section going towards said second open rear end 14.

This also advantageously allows an extremely constant collapsing force to be obtained during an impact, giving said polymeric shock absorbing element 10 a high stability during said impact and, at the same time, also allowing a rupture or a programmed deformation starting from said second open rear end 14 to be prevented.

Said plurality of channel 30 comprises a plurality of walls 32, each of which is, at the same time a wall of another channel 30 of said plurality of channels 30 which are internally tapered towards said second open rear end 14 and in particular towards a planar polymeric stiffening plate 60 which is positioned between said first open frontal end 12 and said second open rear end 14.

Furthermore, said plurality of channels 30 comprises a plurality of second walls 34 each of which is, at the same time, a wall of a corresponding channel 40 of said second plurality of channels 40.

Being preferably surrounded by just channels 30 that are internally tapered towards said second open rear end 14, each channel 40 is thus only formed by a plurality of second walls 34.

Preferably each second wall 34 advantageously has a substantially constant thickness along a longitudinal axis 98, whereas each wall 32 has an increasing thickness towards said planar polymeric stiffening plate 60.

Each channel 40 internally tapered towards said first frontal end 12 being surrounded by channels 30 that are internally tapered towards said second open rear end 14, therefore the total number of second walls 34 is always less than the total number of walls 32.

It is thus advantageously possible to obtain a resistant section that increases much more gradually towards said second open rear end 14, thus obtaining a much more constant collapsing force of said polymeric shock absorbing element 10 during an impact.

Preferably each second wall 34 is substantially inclined with respect to a longitudinal axis 98 of a corresponding channel 40 of an angle which absolute value is included between 0° and 5° and in particular included between 0.5° and 2°.

This furthermore advantageously allows the length of the plurality of channels 30 and 40 to be increased without excessively increasing the extraction force.

Each second wall 34 preferably has a substantially constant thickness along said axis 98 of a corresponding channel 40 and is also substantially inclined with respect to said longitudinal axis 98 of an angle which absolute value is included between 0° and 5° and in particular included between 0.5° and 2°.

This advantageously allows a reduction of the extraction force of said polymeric shock absorbing element 10 from a mould to be obtained and also allows the production thereof and of the mould to be simplified.

Preferably each wall 32, with respect to a longitudinal axis 98 of a corresponding channel 30, has a rake angle which absolute value is included between 0° and 0.2° and in particular included between 0° and 0.1°.

This allows gradual increase of the collapsing force of said polymeric shock absorbing element 10 to be obtained as the resistant section from said first frontal end 12 increases by going towards said second open rear end 14.

Figure 8:
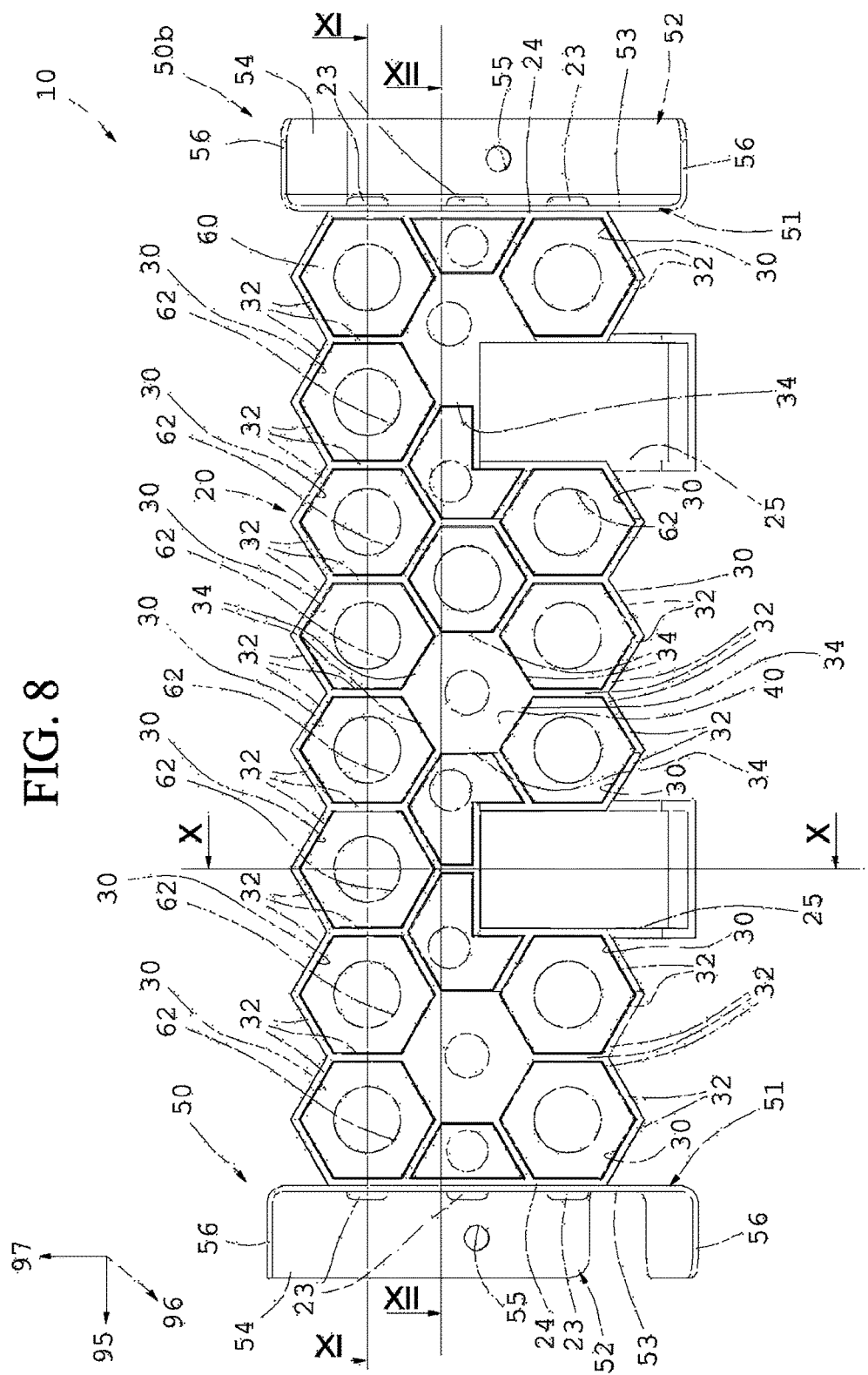
FIG. 8 is a frontal elevation view of the polymeric shock absorbing element of FIG. 4.
Figure 9:
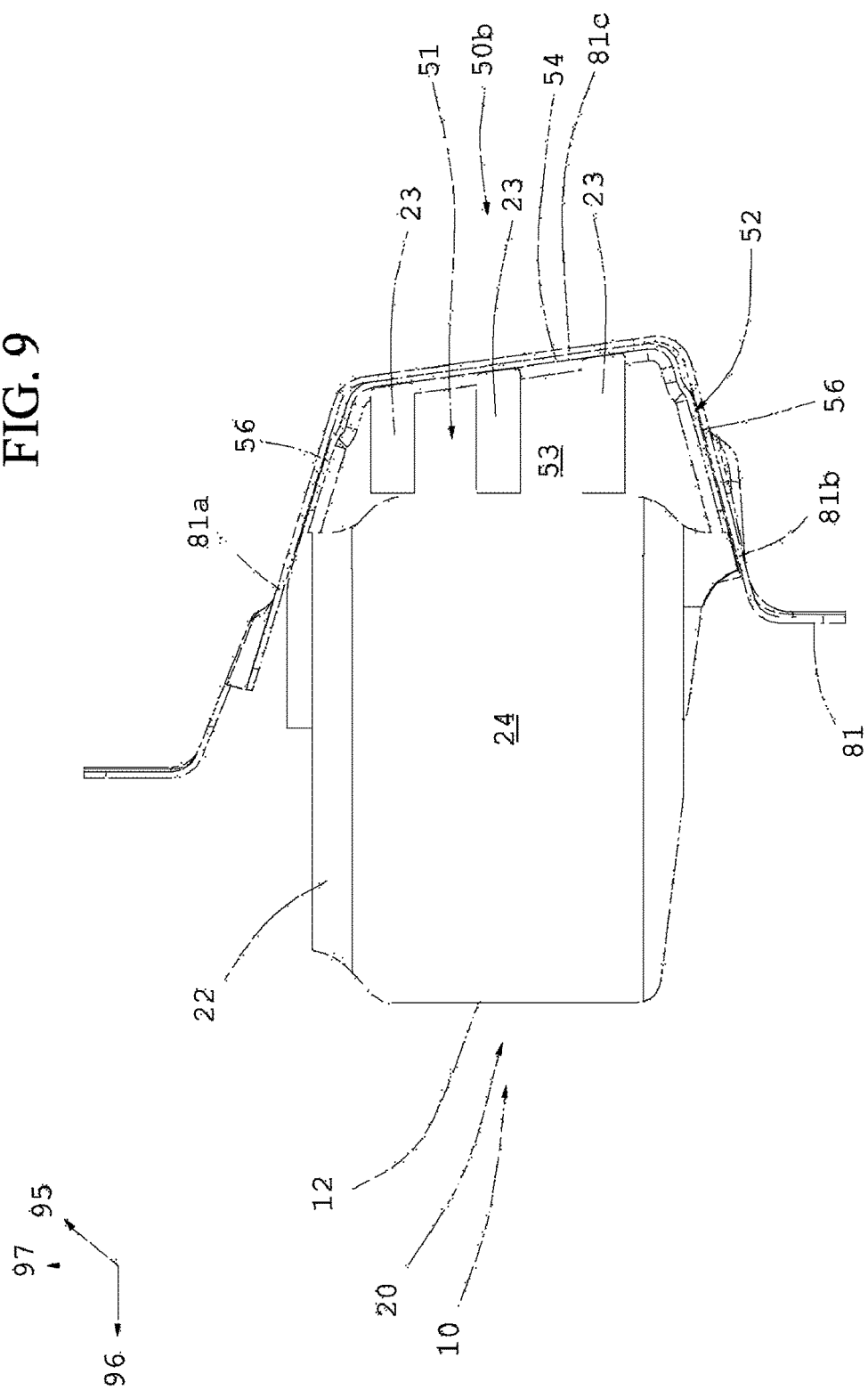
FIG. 9 is a rear elevation view of a detail of FIG. 2.
Figure 10:
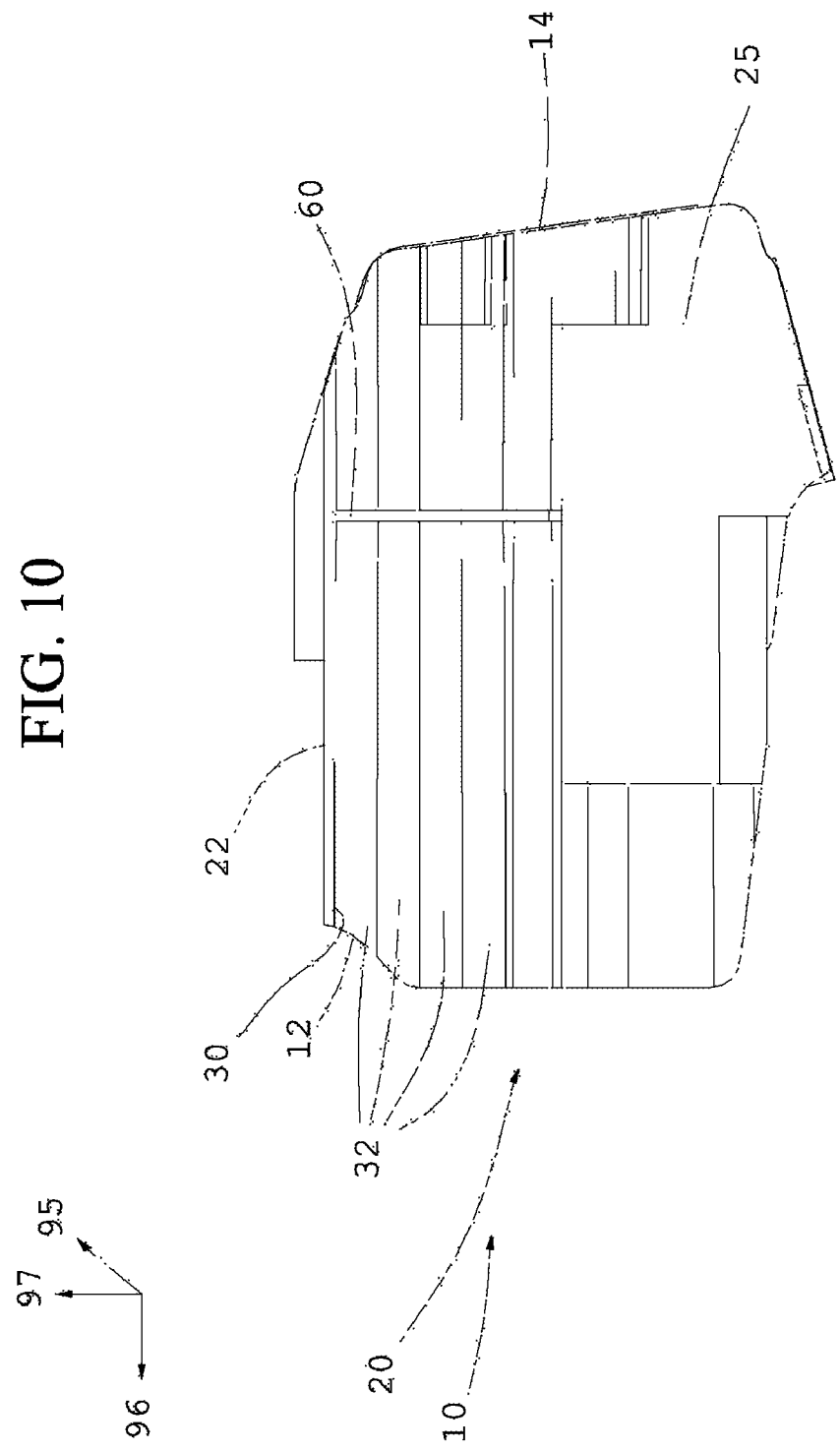
FIG. 10 is a rear elevation view of FIG. 8 sectioned along the line X-X.
Figure 11:
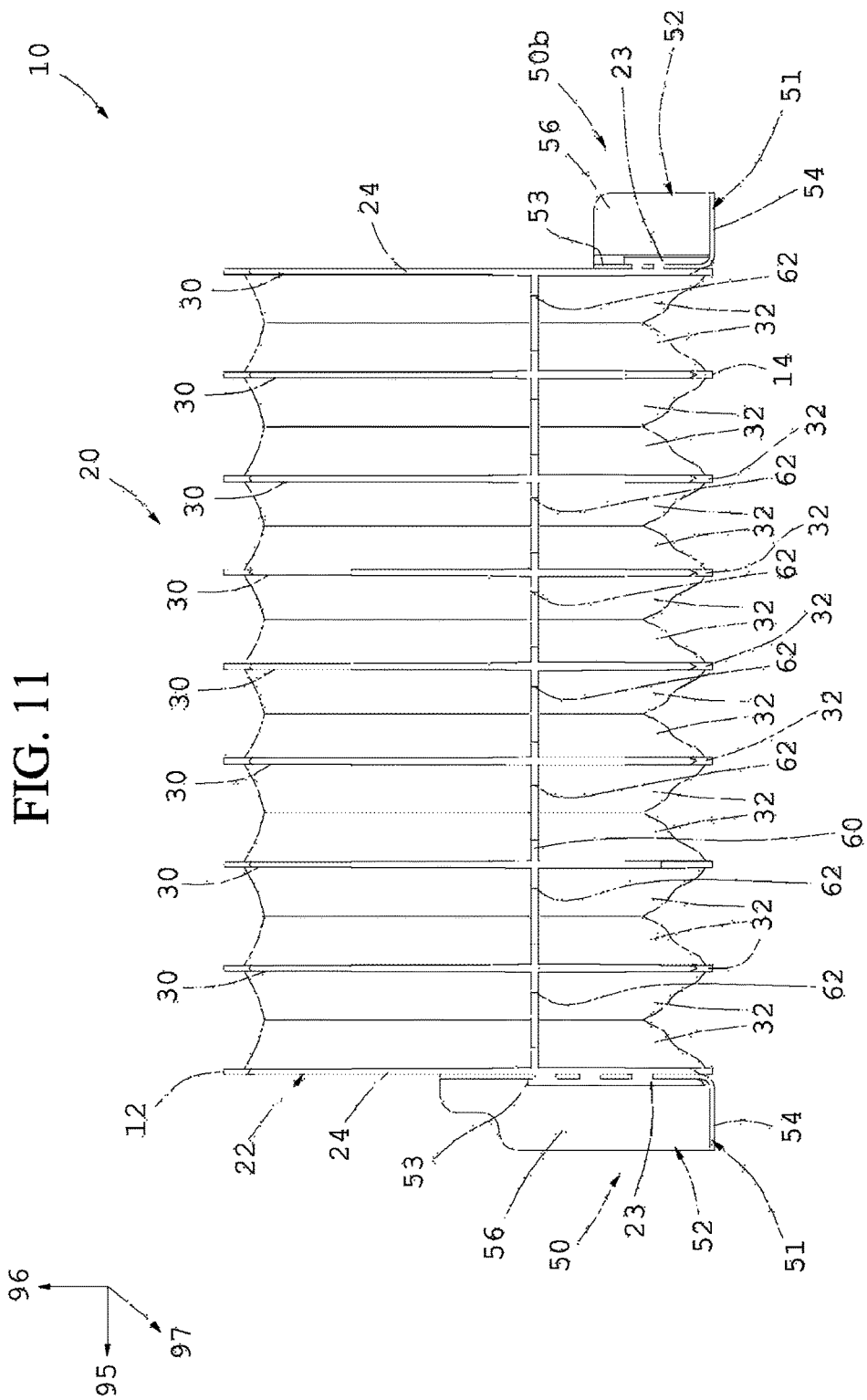
FIG. 11 is a top view of FIG. 8 sectioned along the XI-XI line.
Figure 12:
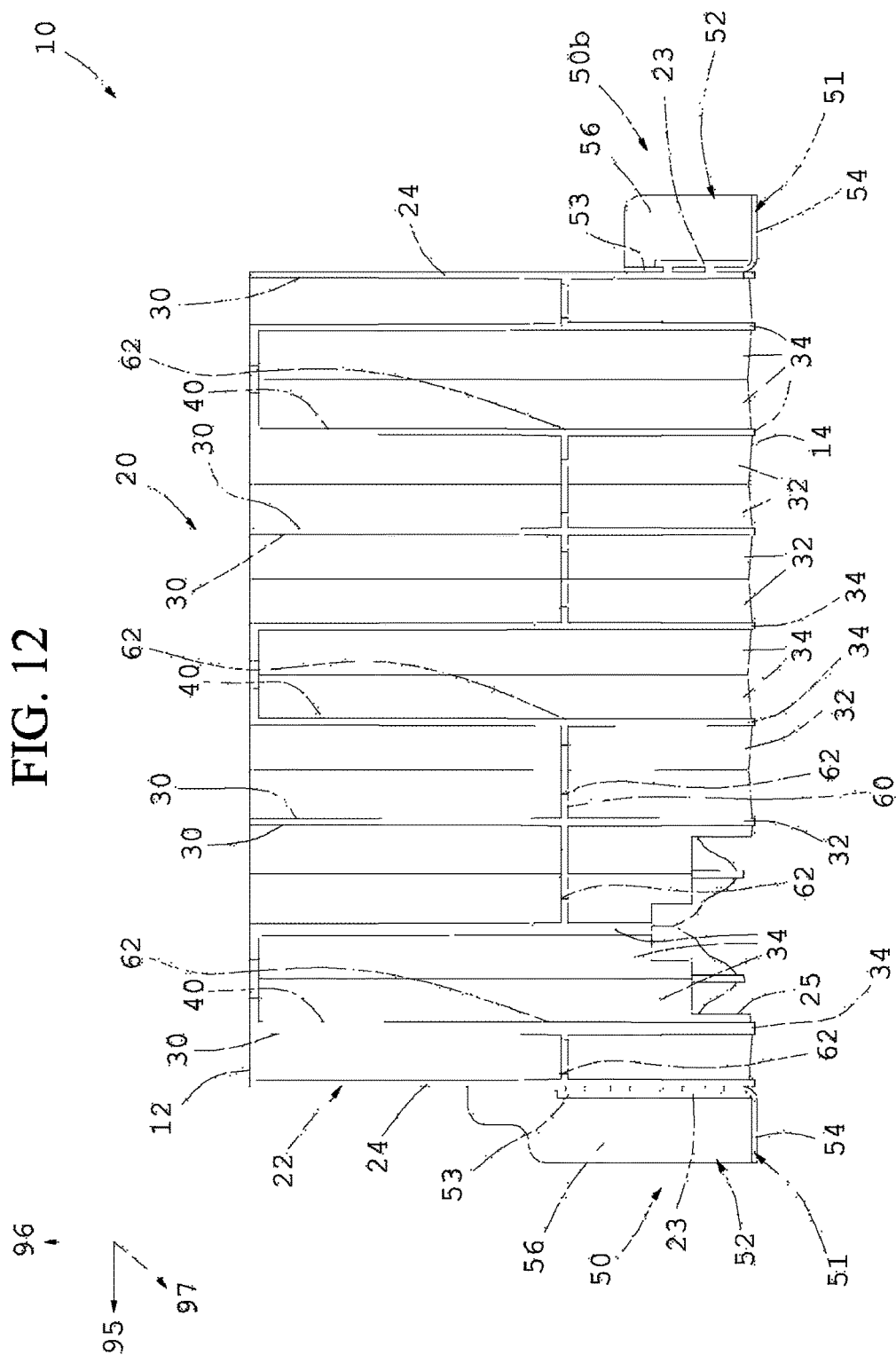
FIG. 12 is a top view of FIG. 8 sectioned along the XII-XII line.

Furthermore, with reference to FIGS. 8 and 13, each channel 40 of said second plurality of channels 40 is preferably not positioned on the lateral external perimeter of said substantially honeycomb structure 20.

This preferably allows high rake angle values to be obtained in some channels 30 and 40 that are mutually adjacent to each other, allowing a significant reduction of the extraction force of said polymeric shock absorbing element 10 and, at the same time, allowing a very stable polymeric shock absorbing element 10 and capable of reducing to a minimum the increase of the resistant section in the direction of said second open rear end 14, thus guaranteeing a collapsing force that is as constant as possible.

Preferably in order to obtain a collapsing force that is as constant as possible during said impact, at least a part of said plurality channels 30 is slightly tapered internally, starting from said first open frontal end 12 to said planar polymeric stiffening plate 60, and moreover preferably has a plurality of walls 32, each of which has a lesser first rake angle 36 which, with respect to an axis 98 of a corresponding channel 30, is preferably included between 0.01° and 1° and in particular included between 0.01° and 0.5°.

This advantageously allows said first open frontal end 12 to be further stabilized during impact, without excessively increasing its resistance to said impact.

In this way a plurality of programmed folds can thus be determined starting from said first open frontal end 12 without limiting the absorption capacity of said shock absorbing element 10.

According to a preferred embodiment, at least one part of said plurality of channels 30 internally has a first lesser average rake angle 36 starting from the said first open frontal end 12, which, with respect to an axis 98 of a corresponding channel 30, has a value preferably included between 0.01° and 1° and, more preferably included between 0.01° and 0.5°, and a second greater average rake angle 76, which is only present in proximity to said planar polymeric stiffening plate 60 and which, additionally, with respect to said axis 98, has a value preferably included between 0.01° and 4° and, even more preferably included between 0.5° and 2°.

In particular said second greater average rake angle 76 is only present in proximity to said planar polymeric stiffening plate 60 in correspondence of an inclined inner profile 75 which is due to stiffening means 70 comprising at least one stiffening portion 74 made in a polymeric material, with which said shock absorbing element 10 is preferably equipped, which is only positioned in proximity to said planar polymeric stiffening plate 60 and said at least one stiffening portion 74 is directly injection-moulded simultaneously in a single piece together with said planar polymeric stiffening plate 60 and with said polymeric shock absorbing element 10.

Advantageously in this way is possible to produce a polymeric shock absorbing element 10 easy to produce and with a reduced production cost.

Preferably at least one part of said plurality of channels 30 is preferably externally tapered towards said planar polymeric stiffening plate 60 and also externally has an average rake angle which, with respect to an axis 98 of each corresponding channel 30 preferably has a value included between 0° and 4° and in particular included between 0° and 2°.

Preferably said first open frontal end 12 has a plurality of frontal faces that are inclined and not orthogonal with respect to a longitudinal direction of the channels 98, thus advantageously allowing the initial collapsing force to be reduced in the first instants of said impact.

Said plurality of frontal faces serves the function of reducing the initial stress during an impact, particularly in the event of a force of impact that is angled with respect to said longitudinal direction 98.

It is thus also possible to always have a frontal face surface that is substantially orthogonal to said angled impact force, consequently obtaining a better distribution of the stress on a greater number of channels 30 of said plurality of channels 30.

On the contrary, without said plurality of frontal faces with angled impact force, a distribution of the stresses is determined on a much smaller number of channels 30 by consequently determining a lower absorbing capacity of the impact since a lesser number of channels 30 would be subject to stress.

According to another aspect of the present invention, it is provided a longitudinal side member 80 for a vehicle comprising at least two metallic plates 81 and 82 which are welded together for form said internal lateral cavity 85, in particular said longitudinal side member 80 is orientable according to a longitudinal direction 95 of said vehicle and it is also preferably positioned in a side position with respect to an interior compartment 99 of said vehicle, moreover said longitudinal member 80 comprises at least one polymeric shock absorbing element 10 of the previously described type for the insertion and fixing inside the internal lateral cavity 85 in particular by welding.

In particular said longitudinal side member 80 comprises a first metallic plate 81 and a second metallic plate 82 at least one of which is substantially omega-shaped.

Preferably said first metallic plate 81 and the second metallic plate 82 are facing one to the other and comprise two zones of contact which are oriented parallel to a vertical direction 97; also said first metallic plate 81 and the second metallic plate 82 are welded together in such a way as to define said longitudinal side member 80 having the form of a tubular metallic element with the internal lateral cavity 85 which consequently is also oriented along the longitudinal direction 95 of said vehicle.

This advantageously allows an overall reduction in the weight of said bumper structure and a good rigidity of said cross member.

This advantageously determines a greater stability of said at least one polymeric shock absorbing element 10 and therefore also of said longitudinal side member 80.

According to a further aspect of the present invention, it is provided a motor vehicle comprising at least one longitudinal side member 80 of the type previously described.

It has thus been seen that a polymeric shock absorbing element for a vehicle and a bumper structure according to the present invention achieve the previously described aims.

The polymeric shock absorbing element for a vehicle and the bumper structure of the present invention thus designed are susceptible to a number of changes and variants, all of which fall under the same inventive concept.

Furthermore, in practice, any materials, and the dimensions and components thereof, can be used depending on the technical requirements.

The invention claimed is:

1. Polymeric shock absorbing element (10) for a vehicle comprising:
   a honeycomb structure (20) having a plurality of channels (30) realized by moulding into a single piece with a polymeric material, each channel (30) is preferably equipped with a hexagonal section;
   said honeycomb structure (20) has an lateral external surface (22) which extends from a first open frontal end (12) to a second open rear end (14);
   said plurality of channels (30) extends internally to said shock absorbing element (10) starting from said first open frontal end (12) to said second open rear end (14);
   each channel (30) of said plurality of channels (30) being internally tapered towards said second open rear end (14) and having an inner rake angle included between 0° and 1.5° measured with respect to a longitudinal extension axis (98) of each channel (30);
   said shock absorbing element (10) being insertable and fixable within an internal lateral cavity (85) of a chassis of said vehicle, where said internal lateral cavity (85) is defined by at least two metallic plates (81) and (82) comprising a first metallic plate (81) and by a second metallic plate (82) which are welded together or which are made integral with each other for forming a longitudinal side member (80) of said vehicle,
   wherein said lateral external surface (22) comprises at least one planar face (24) positioned on one side of said polymeric shock absorbing element (10) and additionally said polymeric shock absorbing element (10) comprises at least one metallic fixing element (50) which includes a central portion (51) having a first central wall (53) which is made integral to a corresponding planar face (24) of said lateral external surface (22), said at least one metallic fixing element (50) additionally comprising a plurality of fastners (56) lateral to said honeycomb structure and which are respectively welded or made integral with a plurality of corresponding inner walls of said first metallic plate (81) and/or of said second metallic plate (82),
   wherein said lateral external surface (22) of said honeycomb structure (20) comprises two planar faces (24) which are positioned on two opposite sides of said polymeric shock absorbing element (10) and said at least one polymeric shock absorbing element (10) additionally comprises a first metallic fixing element (50) and a second metallic fixing element (50b), which are positioned on opposite sides with respect to said honeycomb structure (20), and which are oriented along a longitudinal direction (95) of extension of said internal lateral cavity (85), and
   wherein each metallic fixing element (50) and (50b), is realized with a weldable metallic plate having a thickness of between 1 and 3 mm, and said at least one metallic fixing element (50) is, and wherein i said first central wall (53) of said central portion (51) of said first metallic fixing element (50) and said second metallic fixing element (50b), are perpendicular to said longitudinal direction (95) of said vehicle and positioned internally to said internal lateral cavity (85), and wherein said plurality of lateral fastners (56) are parallel to corresponding inner walls (81a, 81b, 81c) of said first metallic plate (81) and/or of said second metallic plate (82).

2. Polymeric shock absorbing element (10) according to claim 1, wherein said honeycomb structure (20) comprises a plurality of protrusions (23) which externally extend from said planar face (24) into at least three through grooves, which are disposed within said at least one metallic fixing element (50) proximal to said second open rear end (14).

3. Polymeric shock absorbing element (10) according to claim 1, wherein said plurality of channels (30) of said honeycomb structure (20) is oriented in parallel to a longitudinal direction (98) that is inclined with respect to a transverse direction (96) of said vehicle which is, in turn, orthogonal to a longitudinal direction (95) of said vehicle and, additionally, said longitudinal direction (95) and said transverse direction (96) are orthogonal to a vertical direction (97) and, additionally, said first open frontal end (12) is more external to said vehicle with respect to said second open rear end (14), besides said central portion (51) comprises a second central wall (54), which is perpendicular to said first central wall (53), which is aligned with said second open rear end (14) and the same is additionally orthogonal to said transverse direction (96) of said vehicle and is equipped with a through hole (55) and which is additionally weldable within said internal lateral cavity (85) to a vertical wall of said first metallic plate (81) that is more inner to said vehicle with respect to said second metallic plate (82).

4. Polymeric shock absorbing element (10) according to claim 1, wherein each metallic fixing element (50) and (50b), comprises said first central portion (51) is L-shaped having said first central wall (53) which is planar and is made integral with a corresponding planar face (24) of said lateral external surface (22) of said polymeric shock absorbing element (10) and, each metallic fixing element (50) and (50b) comprises a third metallic portion (52) which is U-shaped and which extends perpendicularly to said first wall (51) of said first central portion (51), extending externally with respect to said honeycomb structure (20), and said third metallic portion (52) also includes a second central wall (54) of said first central portion (51).

5. Polymeric shock absorbing element (10) according to claim 1, wherein said honeycomb structure (20) comprises a planar polymeric stiffening plate (60) integrated internally to the same, which is realized in a single piece by injection moulding with said honeycomb structure (20) and with said at least one metallic fixing element (50), with said first metallic fixing element (50) and with said second metallic fixing element (50b), and wherein said planar polymeric stiffening plate (60) is perpendicular to the extension direction (98) of the plurality of channels (30) and is positioned at a predetermined distance in parallel with respect to said second open rear end (14), and is positioned at an intermediate distance between said second open rear end (14) and said first open frontal end (12).

6. Polymeric shock absorbing element (10) according to claim 5, wherein each channel (30) of said honeycomb structure (20) comprises a first channel portion included between said planar polymeric stiffening plate (60) and said first open frontal end (12) and a second channel portion included between said planar polymeric stiffening plate (60) and said second open rear end (14), said first channel portion having a first wall thickness and said second channel portion having a second wall thickness, said second wall thickness having an average value that is at least 20% greater with respect to the average value of said first wall thickness, wherein said first wall thickness starting from said first open frontal end (12) gradually increases towards said planar polymeric stiffening plate (60) and said second wall thickness starting from said second open rear end (14) gradually increases towards said planar polymeric stiffening plate (60).

7. Polymeric shock absorbing element (10) according to claim 5, wherein said planar polymeric stiffening plate (60) comprises a plurality of through holes (62) which are realized on a base surface thereof and which are internally arranged internally to each channel (30).

8. Polymeric shock absorbing element (10) according to claim 1, wherein said honeycomb structure (20) comprises a second plurality of channels (40) realized in a single piece with said plurality of channels (30), said second plurality of channels (40) extending from said second open rear end (14) to said first open frontal end (12), each channel (40) of said plurality of channels (40) being additionally internally tapered towards said first open frontal end (12) and has an inner rake angle.

9. Polymeric shock absorbing element (10) according to claim 8, wherein each channel (40) of said second plurality of channels (40) is only surrounded by channels (30) of said plurality of channels (30) which are internally tapered towards said second open rear end (14).

10. Polymeric shock absorbing element (10) according to claim 8, wherein each channel (40) of said second plurality of channels (40) is surrounded by at least 3 channels (30) which are internally tapered towards a planar polymeric stiffening plate (60).

11. Polymeric shock absorbing element (10) according to claim 8, wherein said plurality of channels (30) comprises a plurality of walls (32), each of which is, at the same time, a wall of another channel (30) of said plurality of channels (30) that are internally tapered towards a planar polymeric stiffening plate (60) positioned between said first open frontal end (12) and said second open rear end (14) and, additionally, said plurality of channels (30) comprises a plurality of second walls (34), each of which is at the same time a wall of a corresponding channel (40) of said second plurality of channels (40), and in that each channel (40) internally tapered towards said first open frontal end (12) only comprises a plurality of second walls (34).

12. Polymeric shock absorbing element (10) according to claim 8, wherein each second wall (34) advantageously has a constant thickness along a longitudinal axis (98), while each wall (32) has an increasing thickness towards said planar polymeric stiffening plate (60).

13. Polymeric shock absorbing element (10) according to claim 1, wherein said polymeric material is selected between: a mixture of a polyphenols-ether (PPE) and a polyamide (PA), a mixture of a polyphenols-ether (PPE) and a polybutylene-terephthalate (PBT), a mixture of a polyphenylene-ether (PPE) and a polyethylene (PE), a mixture of a polyphenylene-ether (PPE) and a polypropylene (PP), a mixture of a polyphenylene-ether (PPE) and a polystyrene (PS), a mixture of a polycarbonate (PC) and a polybutylene-terephthalate (PBT), a mixture of a polycarbonate (PC) and a polyethylene-terephthalate (PET), a polypropylene rubber, and a polyamine rubber.

14. Longitudinal side member (80) for a vehicle comprising at least two metallic plates and in particular a first metallic plate (81) and a second metallic plate (82) at least one of which is omega-shaped, which are welded together to form an internal lateral cavity (85), said longitudinal side member (80) is oriented in a longitudinal direction (95) of said vehicle and is positioned in a side position with respect to an interior compartment (99) of said vehicle, said longitudinal side member (80) additionally comprises at least one polymeric shock absorbing element (10) according to claim 1 for the insertion and fixing internally to said internal lateral cavity (85).

15. A motor vehicle, comprising a longitudinal side member (80) according to claim 14.

16. Polymeric shock absorbing element (10) for a vehicle comprising:
- a honeycomb structure (20) having a plurality of channels (30) realized by moulding into a single piece with a polymeric material, each channel (30) is preferably equipped with a hexagonal section;
- said honeycomb structure (20) has an lateral external surface (22) which extends from a first open frontal end (12) to a second open rear end (14);
- said plurality of channels (30) extends internally to said shock absorbing element (10) starting from said first open frontal end (12) to said second open rear end (14);
- each channel (30) of said plurality of channels (30) being internally tapered towards said second open rear end (14) and having an inner rake angle included between 0° and 1.5° measured with respect to a longitudinal extension axis (98) of each channel (30);
- said shock absorbing element (10) being insertable and fixable within an internal lateral cavity (85) of a chassis of said vehicle, where said internal lateral cavity (85) is defined by at least two metallic plates (81) and (82) comprising a first metallic plate (81) and by a second metallic plate (82) which are welded together or which are made integral with each other for forming a longitudinal side member (80) of said vehicle,
- wherein said lateral external surface (22) comprises at least one planar face (24) positioned on one side of said polymeric shock absorbing element (10) and additionally said polymeric shock absorbing element (10) comprises at least one metallic fixing element (50) which includes a central portion (51) having a first central wall (53) which is made integral to a corresponding planar face (24) of said lateral external surface (22), said at least one metallic fixing element (50) additionally comprising a plurality of fastners (56) lateral to said honeycomb structure and which are respectively welded or made integral with a plurality of corresponding inner walls of said first metallic plate (81) and/or of said second metallic plate (82),
- wherein said lateral external surface (22) of said honeycomb structure (20) comprises two planar faces (24) which are positioned on two opposite sides of said polymeric shock absorbing element (10) and said at least one polymeric shock absorbing element (10) additionally comprises a first metallic fixing element (50) and a second metallic fixing element (50b), which are positioned on opposite sides with respect to said honeycomb structure (20), and which are oriented along a longitudinal direction (95) of extension of said internal lateral cavity (85), and
- wherein said first central wall (53) of said first central portion (51) of said second metallic fixing element (50b) has a lower height with respect to said first central wall (53) of said first central portion (51) of said second metallic fixing element (50).

17. Polymeric shock absorbing element (10) for a vehicle comprising:
- a honeycomb structure (20) having a plurality of channels (30) realized by moulding into a single piece with a polymeric material, each channel (30) is preferably equipped with a hexagonal section;
- said honeycomb structure (20) has an lateral external surface (22) which extends from a first open frontal end (12) to a second open rear end (14);
- said plurality of channels (30) extends internally to said shock absorbing element (10) starting from said first open frontal end (12) to said second open rear end (14);
- each channel (30) of said plurality of channels (30) being internally tapered towards said second open rear end (14) and having an inner rake angle included between 0° and 1.5° measured with respect to a longitudinal extension axis (98) of each channel (30);
- said shock absorbing element (10) being insertable and fixable within an internal lateral cavity (85) of a chassis of said vehicle, where said internal lateral cavity (85) is defined by at least two metallic plates (81) and (82) comprising a first metallic plate (81) and by a second metallic plate (82) which are welded together or which are made integral with each other for forming a longitudinal side member (80) of said vehicle,
- wherein said lateral external surface (22) comprises at least one planar face (24) positioned on one side of said polymeric shock absorbing element (10) and additionally said polymeric shock absorbing element (10) comprises at least one metallic fixing element (50) which includes a central portion (51) having a first central wall (53) which is made integral to a corresponding planar face (24) of said lateral external surface (22), said at least one metallic fixing element (50) additionally comprising a plurality of fasteners (56) lateral to said honeycomb structure and which are respectively welded or made integral with a plurality of corresponding inner walls of said first metallic plate (81) and/or of said second metallic plate (82), wherein said honeycomb structure (20) comprises at least one through hole (25), each of which extends from said first open frontal end (12) to said second open rear end (14), in parallel to said plurality of channels (30), said at least one through hole (25), having a rectangular section that is configured to allows the insertion into the same of a welding clamp for welding, in proximity to said second open rear end (14), and said at least two metallic plates (81) and (82) of said longitudinal side member (80).

* * * * *